(12) United States Patent
Alber et al.

(10) Patent No.: US 11,442,741 B2
(45) Date of Patent: *Sep. 13, 2022

(54) METHOD FOR EXPANDING A FUNCTIONALITY OF A FIELD DEVICE

(71) Applicant: Endress+Hauser Conducta GmbH+Co. KG, Gerlingen (DE)

(72) Inventors: Thomas Alber, Stuttgart (DE); Berthold Götz, Ditzingen (DE); Holger Speck, Constance (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 336 days.

This patent is subject to a terminal disclaimer.

(21) Appl. No.: 16/691,837

(22) Filed: Nov. 22, 2019

(65) Prior Publication Data

US 2020/0089511 A1     Mar. 19, 2020

Related U.S. Application Data

(63) Continuation of application No. 15/843,357, filed on Dec. 15, 2017, now Pat. No. 10,514,936.

(30) Foreign Application Priority Data

Dec. 16, 2016     (DE) ..................... 10 2016 124 671.9

(51) Int. Cl.
*G06F 9/44*        (2018.01)
*G06F 21/00*      (2013.01)
(Continued)

(52) U.S. Cl.
CPC .......... *G06F 9/44505* (2013.01); *G06F 21/00* (2013.01); *G06F 21/629* (2013.01)

(58) Field of Classification Search
CPC ..... G06F 9/44505; G06F 21/00; G06F 21/629
See application file for complete search history.

(56) References Cited

U.S. PATENT DOCUMENTS

| | | | |
|---|---|---|---|
| 2009/0210077 A1* | 8/2009 | Lefebvre | G05B 19/0426 700/81 |
| 2011/0171996 A1 | 7/2011 | Narendra et al. | |

(Continued)

FOREIGN PATENT DOCUMENTS

| | | |
|---|---|---|
| CN | 101681415 A | 3/2010 |
| CN | 104049547 A | 9/2014 |
| CN | 104951691 A | 9/2015 |

*Primary Examiner* — Stefan Stoynov
(74) *Attorney, Agent, or Firm* — Mark A. Logan; Endress+Hauser (USA) Holding Inc.

(57) ABSTRACT

The present disclosure relates to a method for expanding a functionality of a field device for process automation technology in a system using a configuration device, comprising the steps of: establishing a connection from the configuration device to the field device; reading out an order code using the configuration device, wherein the order code represents the current functionalities of the field device; displaying the functionality of the field device on the configuration device; selecting additional, alternative, or lessened functionality of the field device using the configuration device; establishing a connection to a central station; sending information about the additional, alternative, or lessened functionality of the field device to the central station; sending an activation code to activate the additional, alternative, or lessened functionality from the central station; and sending the activation code from the configuration device to the field device and activating the additional, alternative, or lessened functionality of the field device.

9 Claims, 3 Drawing Sheets

(51) Int. Cl.
  *G06F 21/62*  (2013.01)
  *G06F 9/445*  (2018.01)

(56) References Cited

U.S. PATENT DOCUMENTS

2014/0283133 A1\* 9/2014 Rodriguez ............ G06F 21/121
                                                        726/29
2015/0287318 A1\* 10/2015 Nair ....................... G08C 17/02
                                                        340/5.52

\* cited by examiner

METHOD FOR EXPANDING A FUNCTIONALITY OF A FIELD DEVICE

CROSS-REFERENCE TO RELATED APPLICATIONS

The present application is related to and claims the priority benefit of German Patent Application No. 10 2016 124 671.9, filed on Dec. 16, 2016 and Ser. No. 15/843,357, filed on Dec. 15, 2017, the entire contents of which are incorporated herein by reference.

TECHNICAL FIELD

The present disclosure relates to a method for expanding a functionality of a field device for process automation technology in a system via a configuration device.

BACKGROUND

Field devices serving to capture and/or modify process variables are frequently used in process automation technology. Field devices, in general, refer to all devices which are process-oriented and which supply or process process-relevant information. Sensors, in particular, are to be mentioned here, but also other actuators. In general, those units are described as field devices that are directly connected to a field bus and serve to communicate with a control station such as a control system, e.g., remote I/O's, gateways, linking devices, and wireless adapters. The Endress+Hauser Group makes and distributes a large variety of such field devices.

Field devices usually provide different order options in the form of activation codes that can be upgraded after delivery. The usual method for an expansion is that a user reads identification data from the transmitter (serial number and current order code, i.e., the current state of the functionality) and thus contacts the manufacturer of the field device. There, he is advised as to the possible expansions. Next, the customer can order these (e-mail, fax, etc.) and, via e-mail or mail, receive an activation code, connected to a serial number, that he can manually enter in the appropriate field device in a corresponding screen. This process includes many manual actions, is prone to error, and doesn't have a closed path with respect to traceability.

SUMMARY

The present disclosure is based upon the aim of proposing a simpler way for the user to increase the functionality of a field device.

The aim is achieved by a method comprising the steps of: establishing a connection from the configuration device to the field device; reading out an order code via the configuration device, wherein the order code represents the current functionalities of the field device; displaying the functionalities of the field device on the configuration device; selecting additional, alternative, or lessened functionality of the field device using the configuration device; establishing a connection to a central station; sending information about the additional, alternative, or lessened functionality of the field device to the central station; sending an activation code to activate the additional, alternative, or lessened functionality of the field device from the central station; and sending the activation code from the configuration device to the field device and activating the additional, alternative, or lessened functionality of the field device.

By using a configuration device that reads an order code directly from the field device and that transmits this information to a central station, wherein one or more activation codes can subsequently be sent from the central station, wherein they can subsequently be routed to the field device via the configuration device, a closed information chain is created. Fewer errors thus occur, and the process as a whole is easier for the user.

A "functionality" is, in general, a functional expansion that can be activated using an activation code. A user can thus upgrade a basic device with various additional properties, without having to install new firmware. Examples of such a functionality are, for example, the possibility of control via an additional communications protocol, or the possibility of being able to calibrate via HART, or an expanded diagnosis. It can also be the number of supported sensors, relays, and the availability of field bus communication, including specialized controller functions such as feedforward control. Some of these functions also require additional or specialized hardware, but must also be activated using an activation code nonetheless.

The "central station" is a site of the supplier or manufacturer of the field device that can transfer the activation code.

The aforementioned "sending" steps (and also the additional "sending" steps listed below) are not to be interpreted only as the active sending. In one embodiment, the respective data are retrieved. These "sending" steps also do not all need to be performed near in time within minutes or seconds of one another. Depending upon the reception situation, there could even be hours between them. The configuration device also serves as a vehicle, stores data or orders, and transmits them as soon as a connection to the addressee can be established.

In one embodiment, the configuration device establishes a connection directly to the central station, and the central station sends an activation code to the configuration device. In this embodiment, a connection is directly established to the central station, e.g., by a service technician, and an activation code is directly ordered and delivered. Thus, the purchase on the part of the user, for example, can be "ignored." This is helpful for maintenance and service, for example.

In one embodiment, the configuration device establishes a connection to a synchronization point and sends information about the selected additional, alternative, or lessened functionality of the field device to the synchronization point, wherein the synchronization point sends the information about the additional, alternative, or lessened functionality of the field device to the central station, wherein the central station sends the activation code to the synchronization point, and wherein the synchronization point sends the activation code to the configuration device.

In one embodiment, the activation codes of all field devices in the system are synchronized at the synchronization point.

In this embodiment, there is a synchronization point that administers all activation codes for the system. If a configuration device connects to this synchronization point and detects that the functionality to be changed was already ordered, an additional connection to the central station may not be necessary, and the configuration device can transmit the activation code directly to the field device. A configuration device can recognize from the detection that a change to the functionality has already been ordered, that a corresponding order data set is in the synchronization point and/or that a corresponding product (meaning the activation code) is due to be delivered. In one embodiment, when a synchronization point is used, the configuration device does not concern itself about the connection to the central station.

Purchasing, or the purchasing department of the user that is centrally responsible for all purchases for the system, can also be situated between the synchronization point and the central station on the user's end, i.e., within the system.

In one embodiment, the activation code is sent to several configuration devices, and the configuration device that next connects to the field device sends the activation code to the field device.

In one embodiment, the other configuration devices recognize, upon connecting to the field device, that the functionality has already been changed. The recognition that an activation code has been loaded on the field device can be made, on the one hand, in the situation where a different configuration also attempts to write the same activation code to this device, or at the instant where the configuration device is synchronized with the database in the synchronization point; a configuration device that has delivered the activation code can leave a delivery comment so that other configuration devices no longer record the corresponding activation code, or extinguish this delivery order in their "belly."

In one embodiment, the configuration device is a mobile device in particular, a smartphone, pad, or tablet. The mobile device initiates a connection to the central station or to the synchronization point for example, via GPRS, EDGE, UMTS, HSDPA, LTE, or LTE-A. Alternatively, the mobile device connection can be established via WLAN (IEEE-802.11) or LAN.

In one embodiment, the connection from the mobile device to the field device is carried out wirelessly specifically, via Bluetooth in accordance with the 4.0 standard.

In one embodiment, the configuration device is a personal computer in particular, a desktop or notebook computer, or a workstation.

In one embodiment, the configuration device is a single-board computer or an "embedded system."

In one embodiment, the personal computer establishes a connection to the field device directly via a field bus specifically, HART, Profibus, Foundation Fieldbus, Profinet, and EthernetIP or via an additional communication channel to the field bus in particular, via Ethernet or, wirelessly, via IEEE 802.11.

In one embodiment, the configuration device includes the synchronization point.

Therefore, this basically results in three different types of connection from configuration device to field device, viz., via mobile device (smartphone), via wireless connection, via PC and field bus, and via PC with network, using an additional (to the field bus) communication medium (e.g., Ethernet or wireless).

When a configuration device in the form of a mobile device is used, the connection to the central station or synchronization point and to a field device generally is not simultaneous, but, rather, temporally offset. In the case of a personal computer, the connections could also exist simultaneously.

In one embodiment, the serial number of the field device is read out, wherein the activation code is specific to each serial number. For an overview of which functionality is already present, it is sufficient if the order code is read. For the generation of order data, the configuration device must read out and provide, in addition to the functionality to be ordered, also the serial number from the field device. Only in this way can the "seller" generate an individual activation code.

In one embodiment, the configuration device updates the order code in the field device after delivery of the activation code.

In one embodiment, the field device adapts its order code itself.

In one embodiment, the configuration device reads out the updated order code and makes the synchronization point or the central station available.

In one embodiment, the activation code is sent via e-mail.

In one embodiment, all individual functionalities are activated for hierarchical functionalities.

BRIEF DESCRIPTION OF THE DRAWINGS

This is explained in detail with reference to the following figure. Illustrated are.

DETAILED DESCRIPTION

Figure 1:
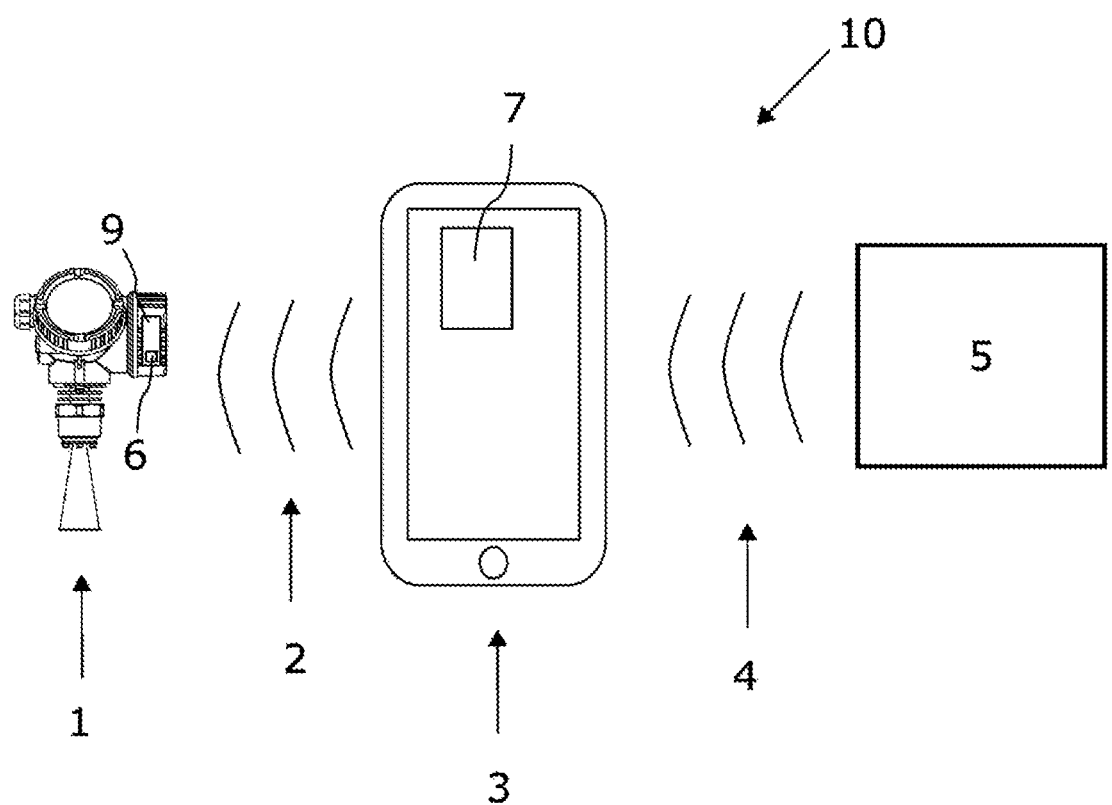
FIG. 1 shows a sensor arrangement for execution of the claimed method.
Figure 2:
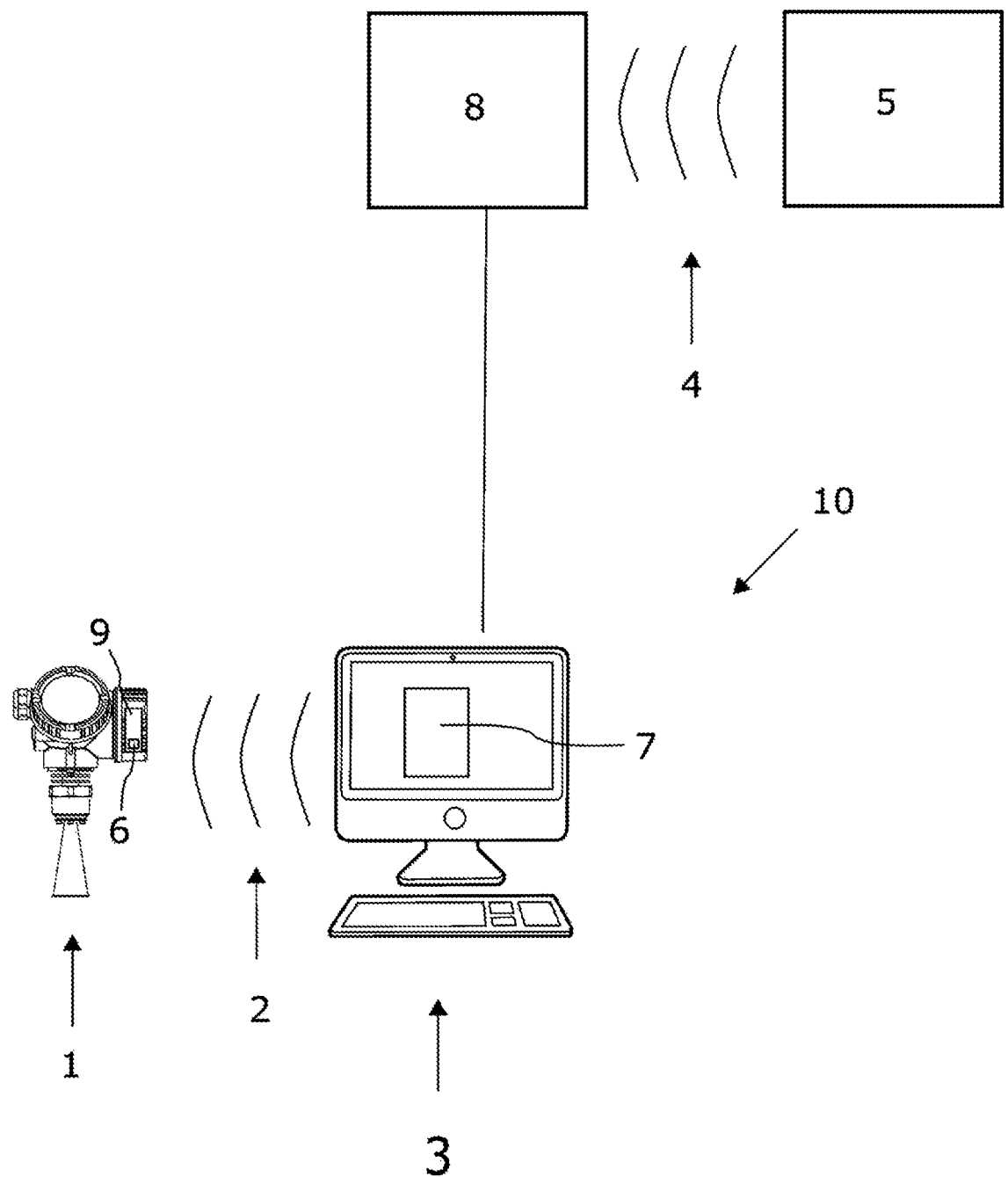
FIG. 2 shows a sensor arrangement in an embodiment for the execution of the claimed method.
Figure 3:
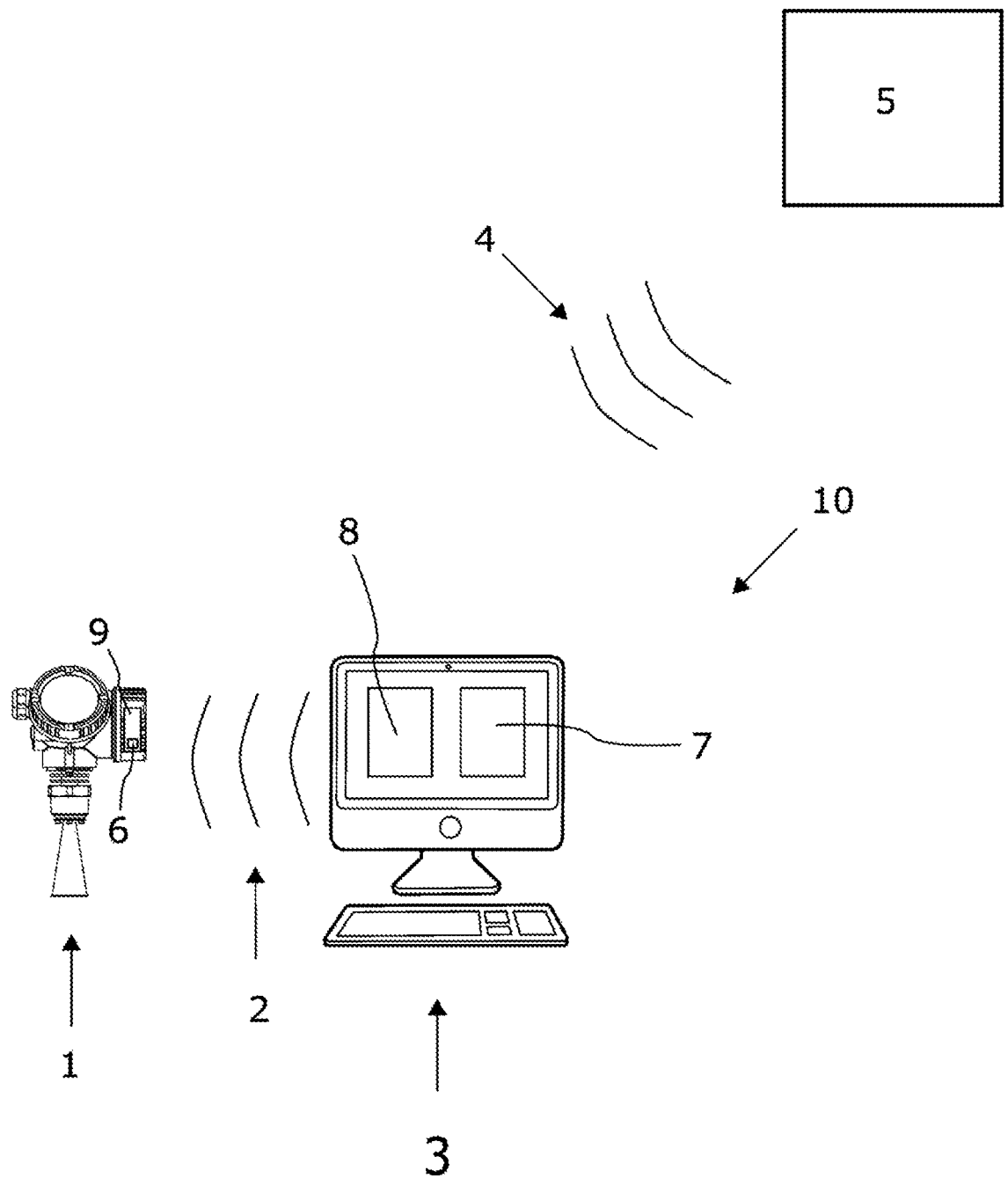
FIG. 3 shows a sensor arrangement in an embodiment for execution of the claimed method.

FIG. 1, FIG. 2, and FIG. 3 show a sensor arrangement 10 having at least one field device 1 more precisely, a sensor. Alternatively, but not illustrated, the field device is a transmitter having a connected sensor or sensors. In the first case, sensors are understood as those that can function without an additional transmitter. In the second case, a combination of sensor and transmitter is meant. A transmitter in this case is thus either a separate device in a separate housing, wherein the sensor is connected to the transmitter, and the transmitter is then further connected via a bus to a higher-level unit, such as a control system, or, alternatively, the transmitter is designed so that it is configured as part of the cable, and the "transmitter in the cable" can be connected directly to the higher-level unit.

Sensor 1 is, for example, a pH, redox potential, or an ISFET, ion-selective, conductivity, haze, or oxygen sensor. Further possible sensors are flow sensors according to the Coriolis principles, magnetic induction, vortex, and ultrasound. Further possible sensors are sensors for measuring the fill-level according to the principles of guided and freely-radiating radar, as well as ultrasound, also for detection of limit level, wherein capacitive methods can also be used to detect the limit level. An additional possible sensor is a temperature sensor, but others are also possible.

In the most general case, field device 1 is any device that can be upgraded or converted by interaction with a configuration device 3.

Field device 1 comprises a wireless module 6. The wireless module is designed as a Bluetooth module, for example. The Bluetooth module is sufficient for low Energy protocol stacks like "Bluetooth Low Energy" (also known as BTLE, BLE, or Bluetooth Smart). Wireless module 6 comprises a corresponding circuit or components for this. Field device 1 thus fulfills at least the "Bluetooth 4.0" standard. Wireless module 6 establishes a connection 2 to a mobile device 3. An alternative wireless connection is accomplished via WLAN or NFC.

Alternatively, and not illustrated, configuration device 3 is connected to field device 1 via a wired connection. This is done via a service interface, for example. This interface is a "CDI interface" of the applicant, for example. Alternatively, the connection is established via USB or Ethernet.

Configuration device 3 is a mobile device, e.g., a smartphone, mobile phone, pad, or tablet. Alternatively, mobile device 3 is a display having a corresponding interface in particular, for establishing connections via Bluetooth and/or WLAN or a mobile radio standard (see below). In one alternative, configuration device 3 is a personal computer, such as a notebook, desktop or the like, as well as a single-board computer or an embedded system.

Field device 1 comprises a computing unit, such as a microcontroller 9, that also includes wireless module 6. Alternatively, wireless module 6 is designed as a separate module.

Mobile device 3 establishes a connection 4 to a central station 5. Connection 4 is established, for example, via a mobile radio standard such as GPRS, EDGE, UMTS, HSDPA, LTE, or LTE-A. Alternatively, the connection of mobile device 3 is established, for example, via WLAN (IEEE-802.11) to a router, access point, or the like that then appropriately transmits the data to central station 5.

Mobile device 3 comprises application software for mobile devices ("app 7"). For the purposes of this application, "app" means application software for smartphones and tablets. As mentioned previously, the mobile device is designed as a smartphone or tablet, for example, having as an operating system Android, iOS, an operating system from Microsoft for mobile devices (current named Windows 10 Mobile; as well as its predecessors or successors), Blackberry OS, or Fire OS.

If the configuration device 3 is designed as a personal computer, the app 7 is to be generally understood as an executable file on the corresponding operating system of configuration device 3, and, therefore, as a program file corresponding to Windows (e.g., .com, .exe, .bat, etc.), Unix/Linux ("X-Bit" set in the file permissions), or MacOS (formerly Mac OS X; .app, bundle; that which was mentioned for Unix correspondingly applies here).

If a user of field device 1 wants to upgrade it, app 7 reads out the order code from field device 1 and displays the possible expansions for the functionalities. "Order code" is understood here as the current status of all functionalities. After selection of one or more options and, as appropriate, a final confirmation, app 7 reads out the additionally necessary data (serial number, for example) and compiles a data packet.

Mobile device 3 places this data packet at central station 5 via a connection 4. In this way, the data packet can be directly detected as an order of the functionality. This is primarily of interest for use by service technicians.

FIG. 2 shows an embodiment. In this view, a synchronization point 8 is connected between configuration device 3 and central station 5. In FIG. 2, configuration device 3 is illustrated as a PC; use of a mobile device as described above is, obviously, possible. Synchronization point 8 manages all activation codes for the system. Synchronization point 8 is a collection and distribution point for the synchronization of one or more configuration devices 3. It is, for example, a network server with typical services such as the aforementioned HTTPS, but also HTTP, FTP, NFS, SAMBA, etc., as appropriate. Alternatively conceivable are, for example, a standard PC, a single-board computer, an embedded system, etc. Connection 4 to central station 5, which assigns the activation codes, is generally accomplished in a wired manner; wireless alternatives are, however, not excluded. If appropriate, the user's purchasing department is still connected in-between.

FIG. 3 shows an embodiment. In this view, configuration device 3 also comprises synchronization point 8. This case describes a PC, for example, that is connected to a field bus or is coupled to a maintenance network and, as appropriate, can communicate directly with the provider via specialized (management) software, for example.

The delivery initiated by the order consists of an activation code that can be sent to the buyer as an attachment to an e-mail, for example. As appropriate, an invoice can be generated directly, and this process can accordingly be stored or archived.

The order placer's configuration device 3 detects this activation code and then acts as an intermediary. As soon as the user connects to the expanded field device 1 using this configuration device 3, the transfer of the activation code can be carried out. After the transfer, the corresponding functionalities are activated. App 7 updates the order code in field device 1 and stores it in a delivery comment, as appropriate. This delivery comment is transmitted to synchronization point 8 and serves to provide traceability. As appropriate, this can also be stored in a database in central station 5.

It is conceivable that more than one configuration device 3 is used especially if the configuration device is designed a mobile device. If more than one mobile device 3 is used, they can all be sent the activation code simultaneously. An order arriving at synchronization point 8 can be retrieved by all mobile devices 3. One of them actually loads the activation code on the target device; the others detect by the next synchronization (on field device 1 or at the synchronization point 8), at the latest that there is already a delivery comment, and erase this order internally.

The reverse case is also possible, viz., that several field devices 1 receive activation codes from a configuration device 3. A collective order can be offered on configuration device 3 for several field devices 1 for example, because these field devices 1 are of the same type. These field devices 1 receive the same functionality expansion, or they are, thereby, brought up to the same functionality. Mobile device 3 likewise receives the corresponding data sets via synchronization point 8.

It is equally conceivable that a configuration device handles not just one activation code, but several per order process.

Each activation code is assigned to a specific field device 1 by a serial number. App 7 can, therefore, correctly parcel the delivery, even if several activation codes for several field devices 1 must be distributed at the same time.

An activation code can be installed via one configuration device 3 without explicit interaction with an operator. Alternatively, confirmation by a user is required.

It is also possible that the delivery be carried out, not by synchronization point 8 via e-mail, but by direct transmission to configuration device 3 more specifically, to app 7 via wireless connection, such as mobile radio (see above).

The effect of an activation code is not necessarily a functional expansion. Equally possible is a functional changeover to an alternative.

In hierarchical functions, where a function "b" requires a function "a", app 7 does not just offer the function "a" as an expansion, so that "a" must first be activated, before the expansion "b" is offered as a possibility; instead, "b" is offered in combination with "a." Analogously, during installation of the activation codes from mobile device 3 on field device 1, corresponding sequence conditions are fulfilled.

As mentioned previously, a maintenance technician can order activation codes without detours. In this context, a connection is made via mobile radio or e-mail directly to a server prepared specifically for this purpose. The owner of mobile device 3 can perform the invoicing, which can be assigned in a second step to a user or a system, as appropriate. The database at the central station or synchronization point can also be updated.

What is claimed is:

1. A method for expanding a functionality of a field device for process automation technology in a system using a configuration device, comprising:
   establishing a connection from the configuration device to the field device;
   reading out an order code from the field device using the configuration device, wherein the order code represents the current functionalities of the field device;
   displaying the current functionalities of the field device on the configuration device;
   selecting additional, alternate, or lessened functionality of the field device using the configuration device;
   establishing a connection from the configuration device directly to a central station using the configuration device;
   sending information from the configuration device about the additional, alternate, or lessened functionality of the field device to the central station;
   sending an activation code to activate the additional, alternate, or lessened functionality from the central station to the configuration device;
   sending the activation code from the configuration device to the field device and thereby activating the additional, alternate, or lessened functionality of the field device;
   the configuration device updating the order code in the field device after the sending of the activation code to the field device; and
   the configuration device reading the updated order code from the field device and making the updated order code available to the central station.

2. The method according to claim 1, wherein the configuration device is a mobile device, a smartphone, a tablet, or a pad.

3. The method according to claim 2, wherein the connection from the configuration device to the field device is accomplished wirelessly via Bluetooth according to the Bluetooth 4.0 standard.

4. The method according to claim 1, wherein the configuration device is a personal computer, a desktop computer, a notebook computer, a workstation, a single-board computer, or an embedded system.

5. The method according to claim 4, wherein the configuration device directly establishes the connection to the field device via a field bus, via an Ethernet channel to the field bus, or via a wireless IEEE 802.11 channel to the field bus.

6. The method of claim 5, wherein the field bus is HART, Profibus, or Foundation Fieldbus.

7. The method according to claim 1, wherein the order code includes a serial number of the field device, and wherein the activation code is specific to the serial number.

8. The method according to claim 1, wherein all individual functionalities are activated for hierarchical functionalities.

9. A method for expanding a functionality of a field device for process automation technology in a system using a configuration device, comprising:
   establishing a connection from the configuration device to the field device;
   reading out an order code from the field device using the configuration device, wherein the order code represents the current functionalities of the field device;
   displaying the current functionalities of the field device on the configuration device;
   selecting additional, alternate, or lessened functionality of the field device using the configuration device;
   establishing a connection from the configuration device directly to a central station using the configuration device;
   sending information from the configuration device about the additional, alternate, or lessened functionality of the field device to the central station;
   sending an activation code to activate the additional, alternate, or lessened functionality from the central station to the configuration device;
   sending the activation code from the configuration device to the field device and thereby activating the additional, alternate, or lessened functionality of the field device;
   the field device updating its order code after the sending of the activation code to the field device; and
   the configuration device reading the updated order code from the field device and making the updated order code available to the central station.

* * * * *